United States Patent [19]
Jacobs, Jr.

[11] Patent Number: 5,689,986
[45] Date of Patent: Nov. 25, 1997

[54] APPARATUS AND METHOD FOR PRENOTCHING AND DIMENSIONALLY MEASURING A ROLL FORMED PART

[76] Inventor: John F. Jacobs, Jr., 16169 Anstell Ct., Mt. Clemens, Mich. 48044

[21] Appl. No.: 715,436

[22] Filed: Sep. 18, 1996

[51] Int. Cl.⁶ .................................................. B21D 28/26
[52] U.S. Cl. ........................ 72/7.4; 72/8.3; 72/11.1;
  72/129; 72/181; 72/339; 83/49; 83/917
[58] Field of Search ........................... 72/7.4, 8.3, 11.1,
  72/131, 129, 181, 339; 83/917, 49, 406, 359

[56] References Cited

U.S. PATENT DOCUMENTS

| | | | |
|---|---|---|---|
| 3,270,541 | 9/1966 | Tishken . | |
| 3,782,233 | 1/1974 | Helm | 83/917 |
| 3,854,359 | 12/1974 | Tagami | 83/406 |
| 3,982,457 | 9/1976 | Berry | 83/917 |
| 4,403,489 | 9/1983 | Munsterman | 72/131 |
| 4,878,368 | 11/1989 | Toutant et al. | 72/181 |
| 5,069,053 | 12/1991 | Wallis | 72/187 |
| 5,207,083 | 5/1993 | Bongiovanni et al. | 72/185 |
| 5,456,099 | 10/1995 | Lipari | 72/181 |

FOREIGN PATENT DOCUMENTS

| | | | |
|---|---|---|---|
| 2628728 | 1/1978 | Germany | 83/917 |
| 1282991 | 1/1987 | U.S.S.R. | 83/917 |

*Primary Examiner*—Daniel C. Crane
*Attorney, Agent, or Firm*—Young & Basile, PC

[57] ABSTRACT

A plurality of successively spaced notches are formed in a side edge of a metal strip by first and second adjustably positionable dies prior to roll forming of the strip to a formed configuration. After roll forming, fingers engage selected edges of the notches to detect a notch length dimension and a full part length dimension. Sensors detect the position of the fingers and generate output signals to a controller which generates an adjustment signal based on the switch conditions to adjustably position the first and second dies to accommodate any elongation of the metal strip during roll forming.

21 Claims, 12 Drawing Sheets

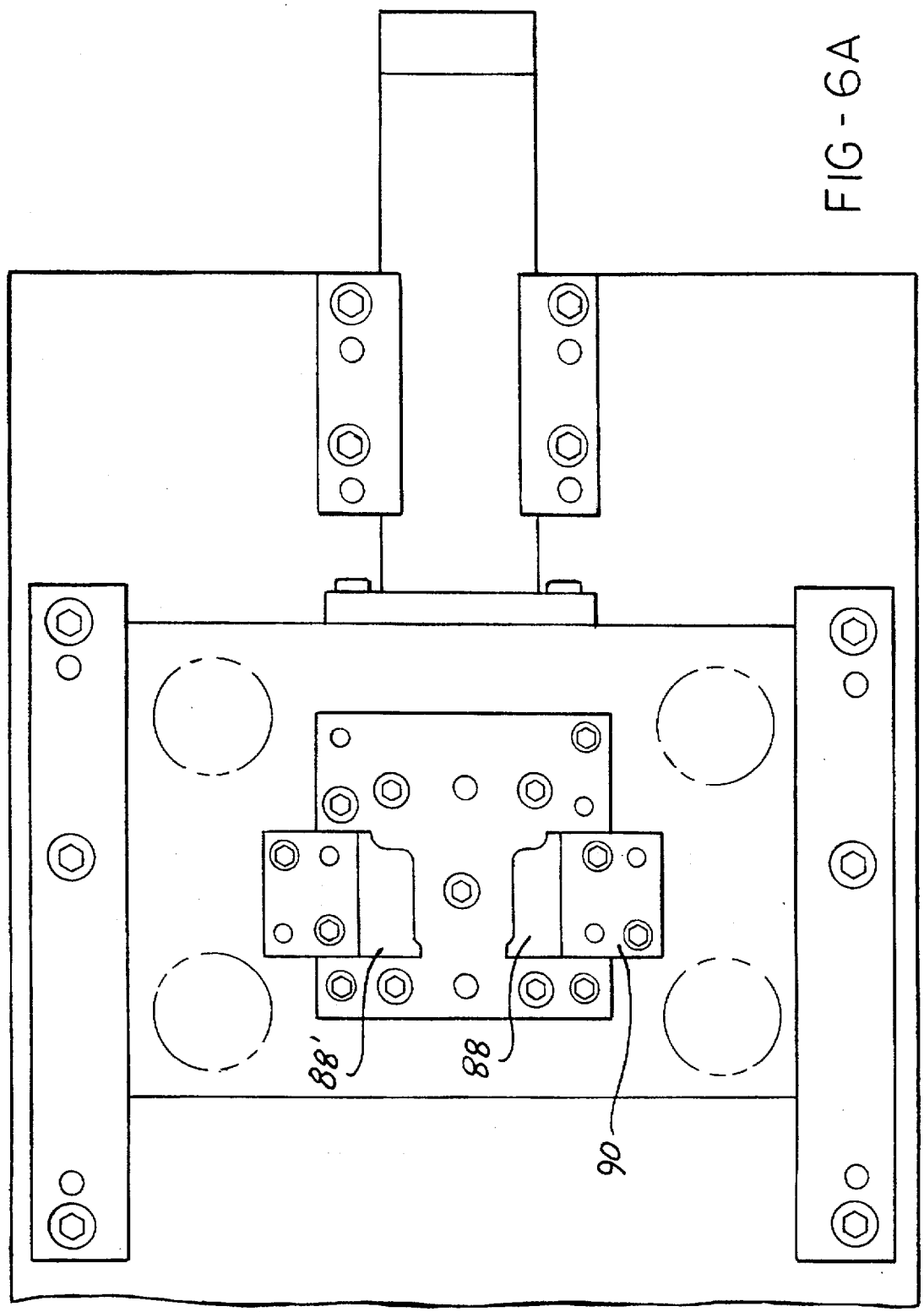

APPARATUS AND METHOD FOR PRENOTCHING AND DIMENSIONALLY MEASURING A ROLL FORMED PART

BACKGROUND OF THE INVENTION

1. Field of the Invention

The present invention relates, in general, to roll forming apparatus.

2. Description of Background Art

Roll forming machines are employed to bend a flat metal strip to a formed contour, such as a U or C-shaped channel. A roll forming machine utilizes a series of successively arranged roller pairs which are formed with varying contours to progressively form the metal strip to the desired shape as the metal strip passes through the rollers.

Each roller pair is spaced apart by a distance equal to the nominal thickness of the metal strip. Variations in thickness of the metal strip from the nominal thickness and/or variations in hardness of each metal strip result in variable elongation of the metal strip as it passes through the roller pairs. It is known that the thicknesses of metal strips vary when the strips are cut from a single large width coil, dependent upon the lateral position of the strip in the coil. Generally, strips cut from the center portion of the large coil tend to be of greater thickness than strips cut from the outer edges of the coil. Further, the hardness of each metal strip may vary from coil to coil.

Although variable elongation of a roll formed part resulting from variations in thickness and/or hardness of the metal strip usually poses little problem for most part configurations, the elongation of the strip causes more significant problems when notches are formed in the strip, as shown in FIGS. 1-3. Frequently, pairs of opposed notches are cut into the side edges of the strip to form successively spaced notch pairs in the finished roll formed part. When the strip is roll formed to a channel-like configuration, the notches are generally located at each end of the side edge flanges of the roll formed part to provide an opening for the insertion of slider members, attachment tools, etc., into the interior of the channel-like part.

Generally, the variable elongation resulting from variable thicknesses of successive strips and/or variable hardnesses between strips cut from different coils can be accommodated by designing into the roll forming machine an amount of expected elongation. However, this requires the production of numerous, waste parts before the exact variable elongation is obtained.

Further, to improve product quality, it is necessary to reduce dimensional variations in roll formed parts which contain notches, particularly with respect to the total length of each part after it is cut off from the metal strip as well as the length of each notch on each part.

Thus, it would be desirable to provide an apparatus and method which overcomes the aforementioned problems encountered in prior art roll forming machines. It would also be desirable to provide an apparatus and method for roll forming a part containing notches in which the notch forming means or dies are adjustably positionable to accommodate variations in strip thickness and/or hardness.

SUMMARY OF THE INVENTION

The present invention is an apparatus and method for prenotching and dimensionally measuring a roll formed part.

The apparatus comprises notch forming means for successively forming a plurality of longitudinally spaced first notches in one side edge of a longitudinally advancing metal strip, each first notch having longitudinally spaced first and second edges. Means are provided for adjustably positioning the notch forming means. Roll forming means form the metal strip into a formed configuration.

Means are provided for sensing a first notch dimension in the formed configuration of the metal strip, the sensing means generating an output signal indicative of the sensed first notch dimension. Control means, responsive to the output signal, compares the output signal with a nominal first notch dimension and for generating an adjustment signal to the means for adjustably positioning the notch forming means upon determining a difference between the sensed first notch dimension and the nominal first notch dimension.

Preferably, the notch forming means includes means for forming longitudinally spaced first notches in each of the first and second side edges of the strip, pairs of first notches being laterally spaced from each other on the strip. Further, the notch forming means includes first die means for forming a first portion of each first notch and second die means for forming a contiguous second portion of each notch, the adjustable positioning means adjustably positioning at least one and, preferable both of the first and second die means.

The means for sensing a notch dimension includes first and second locators movably engagable with opposed first and second edges of one first notch in the strip. Sensor means detect first and second positions of at least one of the first and second locators. The first position is indicative of one of the first and second locators engaging the metal strip but not disposed within the first notch, and the second position is indicative of one of the first and second locators passing into the first notch. The means for sensing a notch dimension further includes first and third locators movably engagable with like positioned first and second edges of two longitudinally spaced first notches in the strip. Sensor means detect first and second positions of each of the first and third locators, respectively.

The method of the present invention comprises the steps of:

successively forming by notch forming means a plurality of first notches, each having longitudinally opposed edges in one side edge of a metal strip;

roll forming the strip to a formed configuration by passing the strip progressively through a plurality of roller sets;

sensing a notch dimension in the strip after roll forming;

comparing the sensed notch dimension with a nominal notch dimension; and if a difference is detected between the sensed notch dimension and the nominal notch dimension, adjusting the longitudinal position of the notch forming means to reduce the difference.

The present method also includes the steps of forming each of the first notches in two stages by forming a first portion of each first notch by a first die in a first stage and forming a contiguous second portion of each first notch by a second die in a second stage.

For measuring notch length, the step of comparing further includes the step of detecting a dimensional difference between a dimension between the first and second longitudinally spaced edges of one of the first notches and a nominal dimension between the first and second edges of the first notch. For measuring overall part length, the comparing step further includes the step of detecting a dimension difference between one of the first and second edges of one first notch and a like one of the first and second edges of the subsequent first notch in the strip and a like nominal dimension.

The step of sensing a notch dimension, i.e., and/or part length, includes the steps of advancing a first locator toward the first edge of one first notch, advancing a second locator toward a second edge of the one first notch, and sensing a dimension between the first and second edges of the one first notch by the position of the first and second locators. A first difference signal is generated and input to the control upon a non-full advance of the second locator into the one first notch. A second difference signal is generated upon a full advance of the second locator into the one first notch.

The step of sensing a notch dimension further includes the steps of advancing a first locator toward the first edge of one first notch, advancing a third locator toward the second edge of a consecutively spaced first notch, and sensing the distance of advance of the third locator.

The step of sensing a notch dimension further includes the steps of generating a first difference signal upon detecting a non-full advance of the third locator into the one first notch, and generating a second difference signal upon detecting a full advance of the third locator into the one first notch.

The method further includes the steps of adjustably positionably mounting the first die in the first stage, adjustably positionably mounting the second die in the second stage, and adjustably positioning the first and second dies independent of each other in response to a difference detected between a sensed notch dimension and a nominal dimension. The step of adjusting position of the first and second dies comprises the step of adjustably positioning both of the first and second dies in response to a detected dimensional difference.

The apparatus and method of the present invention overcomes problems encountered in previously constructed roll forming machines in which a notch or notches are formed in each part prior to roll forming and severing each part from an elongated strip passing through the successively spaced roller pairs in the roll forming machine. According to the present apparatus and method, the notch forming means are adjustably positionable to enable the locations of the notches in the strip to be repositioned to maintain notch length and the overall length of each part within acceptable dimensional tolerances despite variable elongation of the strip during roll forming caused by variations in strip thickness and/or hardness. The apparatus includes notch dimension and part length dimension sensing means which detects the relative location of the notches in the strip to enable the sensed notch dimension to be compared with a corresponding nominal notch dimension. A control means generates adjustment signals to adjustable positioning means connected to the notch forming means or dies to adjustably position the die or dies to vary the notch length or location.

According to a preferred embodiment, the notch forming means is formed of at least two longitudinally spaced dies, each of the dies forming a separate portion of each notch. The use of at least two dies enables both the notch length and the overall length of each part to be adjusted to accommodate variations in elongation of the metal strip during roll forming.

Further, the notch dimension sensing as well as the adjustable positioning of the notch forming means or dies takes place without interference with the overall roll forming operation so as not to effect production levels.

BRIEF DESCRIPTION OF THE DRAWING

The various features, advantages and other uses of the present invention will become more apparent by referring to the following detailed description and drawing in which:

FIG. 6A and 6B are plan views of the first and second stage notch forming dies, respectively, mounted in the press shown in FIG. 5;

DESCRIPTION OF THE PREFERRED EMBODIMENTS

Figure 1:
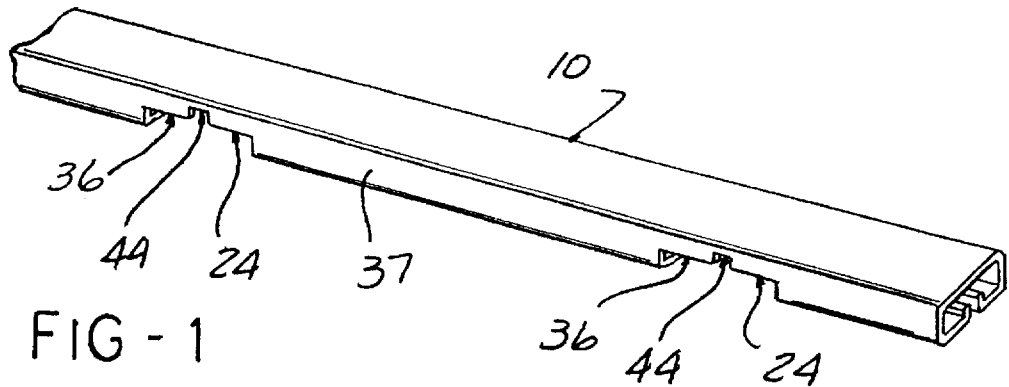
FIG. 1 is a perspective view of an exemplary shaped metal strip formed by the roll forming apparatus and method of the present invention.
Figure 2:
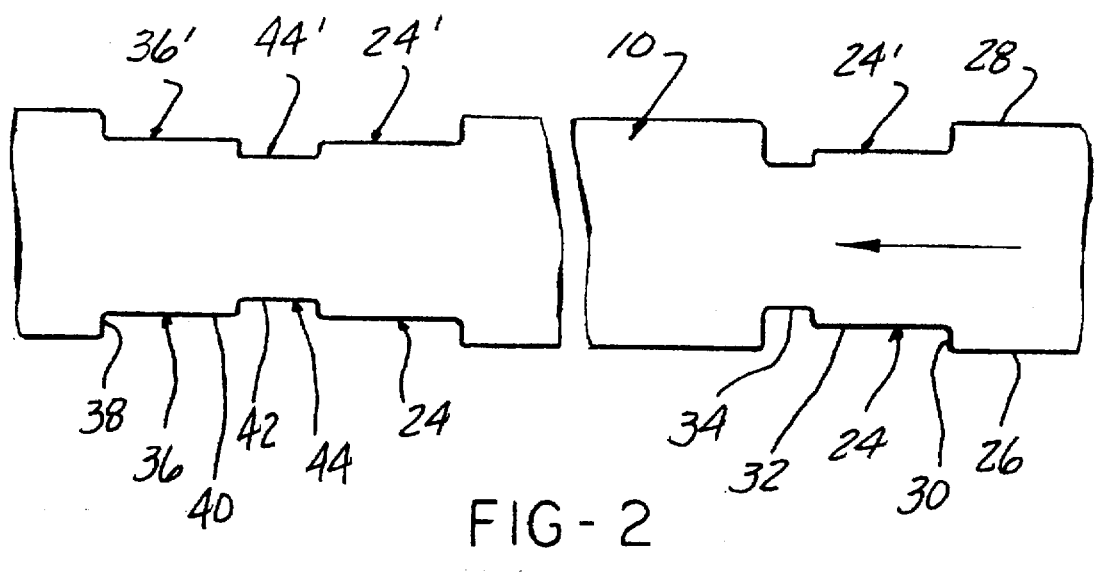
FIG. 2 is a plan view of the metal strip prior to roll forming into the configuration shown in FIG. 1, and showing the formation of successive notches in the metal strip.
Figure 3:
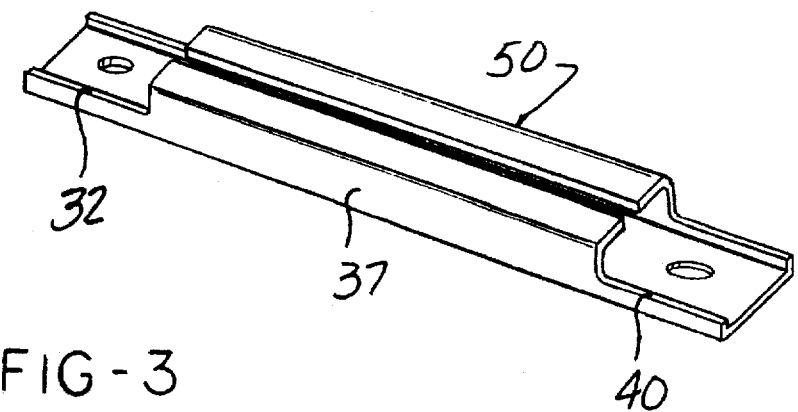
FIG. 3 is a perspective view of the bottom surface of a single roll formed part after notch formation and cutoff from the strip shown in FIG. 1.

The present invention is an apparatus and method for forming a roll formed part generally shown in FIGS. 1, 2 and 3. It will be understood that the specific configuration of the roll formed part, the configuration and number of notches in the part, as described in greater detail hereafter, can vary depending on the specific application requirements.

Figure 4:
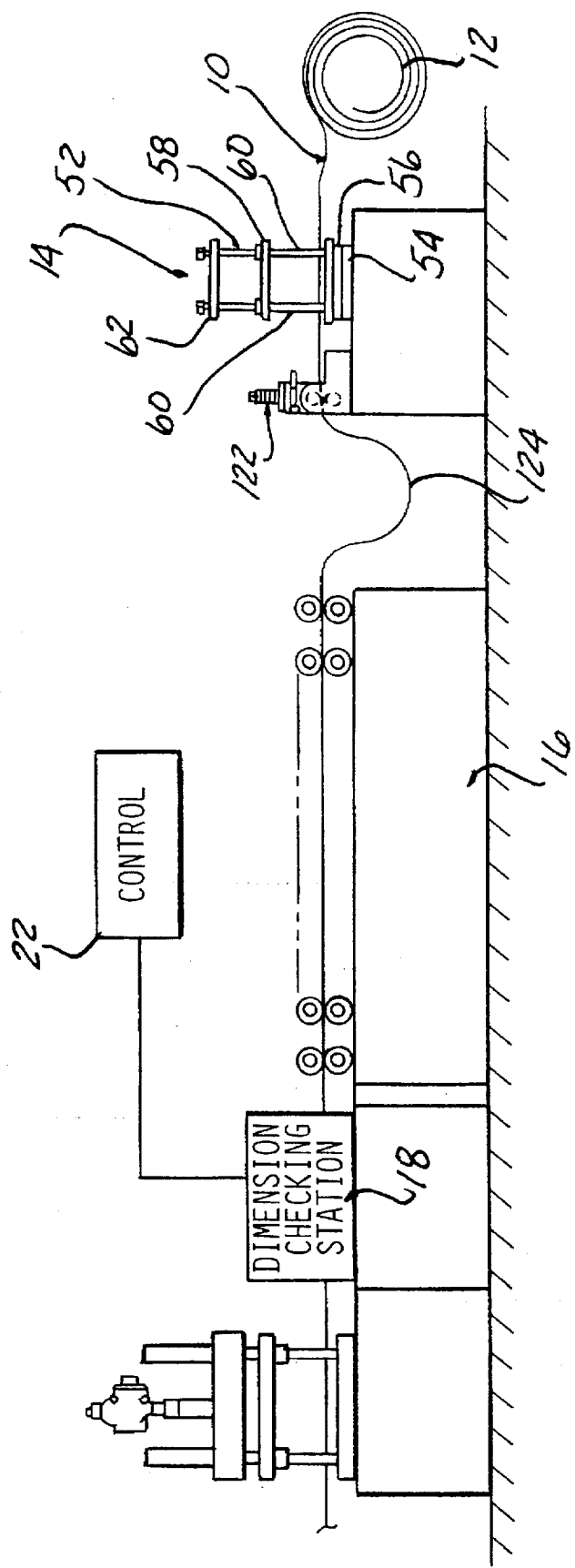
FIG. 4 is a pictorial representation of the roll forming apparatus of the present invention.

As shown in FIG. 4, the present apparatus includes a metal strip 10 which is drawn from a coil 12 and passed through a notched die station 14. The strip 10 then passes through a conventional roll forming station 16 in which the strip 10 successively passes through a plurality of longitudinally spaced roller pairs which have varying configurations to progressively bend the metal strip 10 into the desired cross sectional configuration. After exiting the roll forming station 16, the metal strip 10, which is now bent into its desired, final configuration, passes through a dimension checking station 18 before entering a length cutoff station 20 wherein each workpiece or part is cut to the desired length from the strip 10. A control means 22 interconnects the various stations to provide overall control for the apparatus and method of the present invention.

In general, the metal strip 10 enters the notch die station 14 in a flat form. A notch forming means, as described hereafter, which exemplary is provided in first and second longitudinally spaced stages includes, in a first stage, a pair of laterally opposed first stage dies which form a first notch portion 24 and 24' in opposed side edges 26 and 28 of the strip 10 as shown in FIG. 2. The specific notch 24 and 24' configuration, described hereafter, is by way of example only. The first notch portion formed by the first stage dies includes a first longitudinal end 30 extending inward from the side edge 26 of the strip 10, a longitudinal portion 32 and a recess 34.

After passing through the first notch forming stage, the strip 10 enters the second stage wherein a second notch portion, shown by reference numbers 36 and 36' in FIG. 2, is formed contiguous with the respective first notch portions 24 and 24' to form a pair of notches. The second notch portion 36 also includes a second longitudinal end 38, a second horizontally extending portion 40 and a recess 42. The recess 42 is contiguous with the recess 34 formed in the first stage to form an overall recess having a length substantially equal to the width of a cutoff blade or element used to separate successive workpieces or parts from the metal strip 10.

As the metal strip progresses through the roll forming machine 16, the side edges 26 and 28 are progressively bent downward and then inward to form opposed L-shaped sections shown in FIGS. 1 and 3.

After cutoff in the cutoff station 20, each workpiece denoted generally by reference number 50 in FIG. 3 has opposed notch ends, with an inward extending channel portion formed therebetween. The opposed notch pairs 24, 24', 36 and 36' form open ends on each part 50 to enable a slider element, not shown, to be easily inserted within the interior of the inward extending channel portion of each part 50 as well as to enable a rivet gun to be brought into engagement with the flat central surface of each part 50 for mounting a rivet through an aperture formed in the part 50 as shown in FIG. 3.

The notch forming means of the present invention includes a conventional press 52, shown in FIG. 4 having a base 54 which supports a lower platen 56 and a movable upper platen 58. Guide rods 60 extend between the lower platen 56 and through the upper platen 58 to an upper support structure denoted by reference number 62 which supports the press drive means used to move the upper platen 58 toward and away from the lower platen 56.

Figure 5:
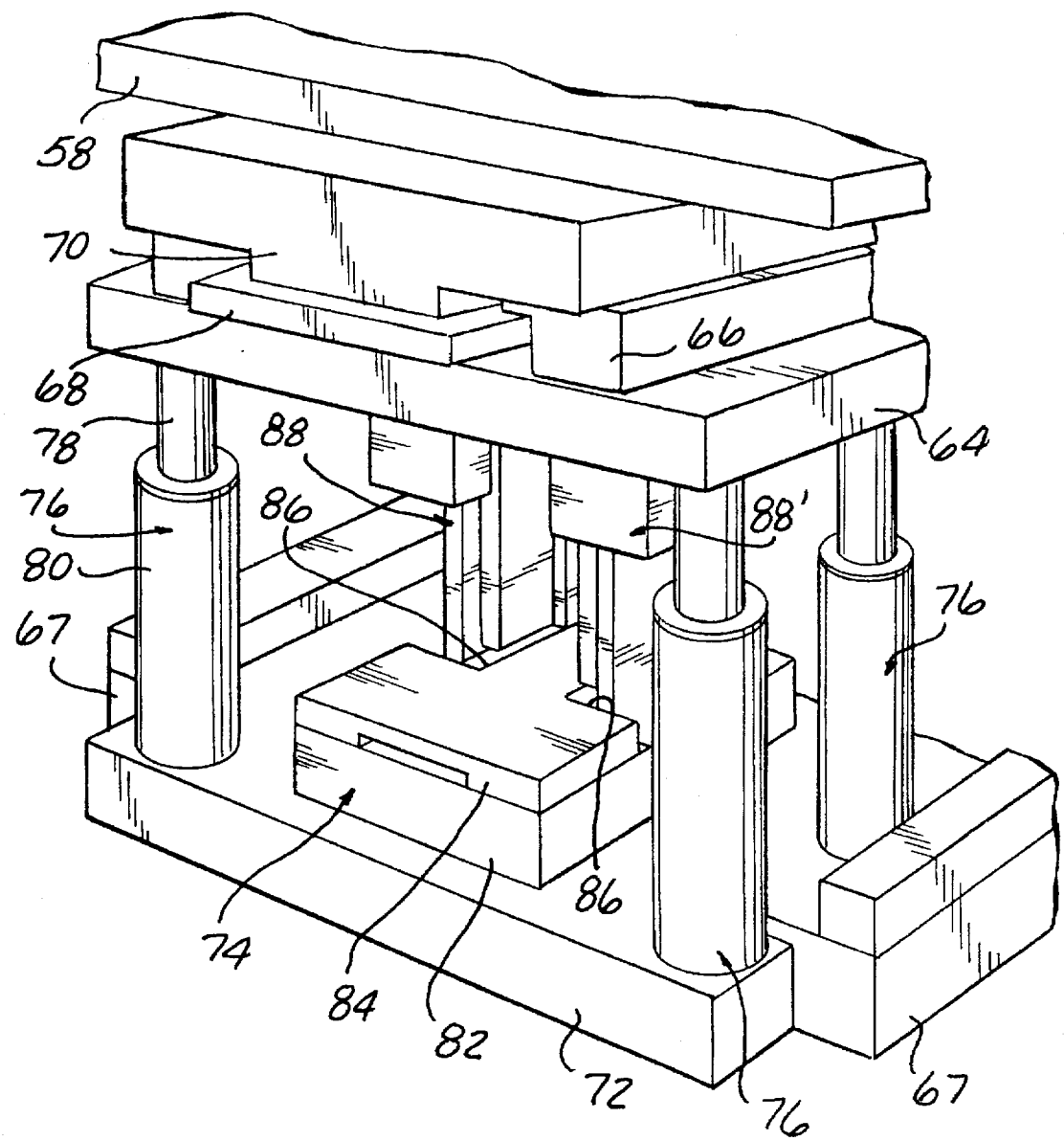
FIG. 5 is a perspective view of one end of the notch forming means of the present apparatus.

Referring now to FIG. 5, an upper die shoe 64 is slidably connected to the upper platen 58 by means of a longitudinal slide mechanism formed of a pair of spaced channels 66 which support a slide plate 68 underlying a t-shaped slide support 70.

A lower die shoe 72 is slidably mounted on the lower platen 56 by a slide mechanism, similar to the upper slide mechanism, and which includes a pair of spaced channels 67 fixed to the lower platen 56. The lower die shoe 72 supports a die base 74. A plurality of guide rods 76 formed of guide posts 78 slidably received in cylindrical members 80 are mounted at the four corners of the upper die shoe 64 and the lower die shoe 72 to control the bi-directional movement of the upper shoe 64 with respect to the lower die shoe 72.

The die base 74 includes a base support 82 fixedly attached to the lower die shoe 74. A lower plate 84 is mounted on the base 82 and includes a pair of opposed notch die receiving recesses 86 which are sized to slidably receive each notch die in the first die stage.

As shown in FIGS. 5 and 6A, the notch forming means includes a first stage formed of at least one and preferably a pair of opposed first dies 88 and 88'. As the first stage dies 88 and 88' are identically constructed, the following description will be provided only for the first notch die 88.

The first notch die 88 has a configuration to form the first portion 24 of each notch in one side edge 26 or 28 of the metal strip 10 as the metal strip 10 passes through. The first notch die 88 is fixedly secured to a die support 90 which is in turn connected to the slide plate 68 and longitudinally movable with movement of the slide plate 68 as described hereafter.

Figure 6B:
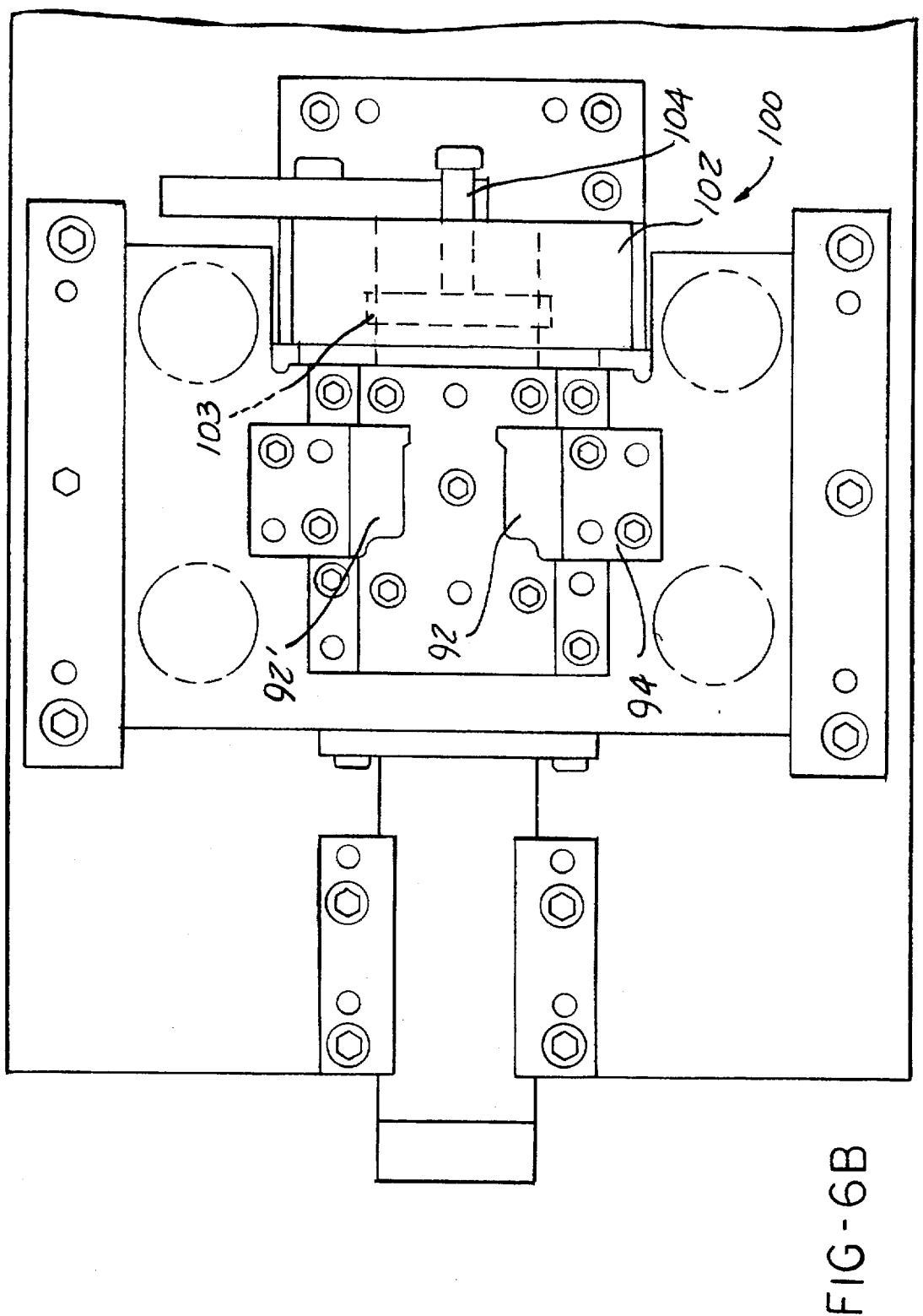

The second notch die stage shown in FIG. 6B includes similarly formed second notch dies 92 and 92', each of which is fixedly mounted to a notch die support 94 affixed to a separate slide plate, similar to slide plate 68, mounted on the upper platen 58. The second notch dies 92 have a configuration to form the second portion 36 of each notch as shown in FIG. 2.

Figure 6C:
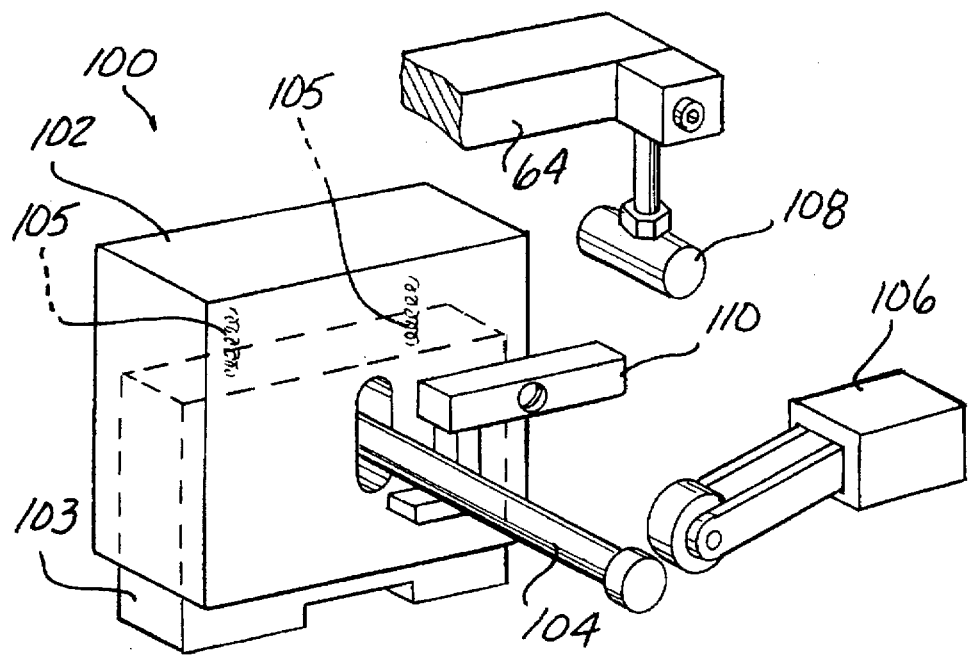
FIG. 6C is a perspective view of the notch press trigger mechanism.

As shown in FIG. 6C, a notch press trigger mechanism denoted generally by reference number 100 is mounted in the second stage of the notch forming station 14 to detect the advance of each first notch portion into the second stage of the notch forming station 14. The trigger mechanism 100 includes a housing 102 mounted on the lower die shoe 72. A stop plate 103 with an angled front surface is mounted within the housing 102. A rod 104 is mounted on the stop plate 103 and extends outward from the housing 102. The rod 104 is biased by the springs 105 to a normal position to engage edge 30, shown in FIG. 2, of a notch 24 as the metal strip 10 advances through the notch forming press.

When the end of the stop plate 103 engages the edge 30 of a notch 24, the rod 104 pivots downward and activates a limit switch 106 also mounted on the lower die shoe 72 which generates a trigger signal to the control means 22 to initiate the stamping operation of the press in which the upper die shoe 64 moves toward the lower die shoe 72 bringing the notch dies 88, 88', 92 and 92' in each of the first and second stages into engagement with the metal strip 10 to form the first and second notch portions 24 and 36, as described above.

As the upper die shoe 64 is lowered, an actuator 108 extending downward from the upper die shoe 64 engages a pivotal arm 110 mounted on the housing 102 which engages and resets the rod 104 and the stop plate 103 to their normal position to detect the next notch 24 in the metal strip 10.

As shown in FIG. 4, at the downstream end of the notch die station 14, a slip roller pair 122 is mounted on a base. One of the rollers of the roller pair 122 is motor driven to pull the strip 10 from the notch die station 14. The opposed roller of the roller pair 122 engages the strip 10 under spring pressure to provide slip so as to enable a loop denoted by reference number 124 in the metal strip 10 between the notch die station 14 and the roll forming machine 16 to be taken up as the notch dies 88, 88', 92 and 92' engage and momentarily stop advance of the strip 10 in the notch press 14.

Figure 7:
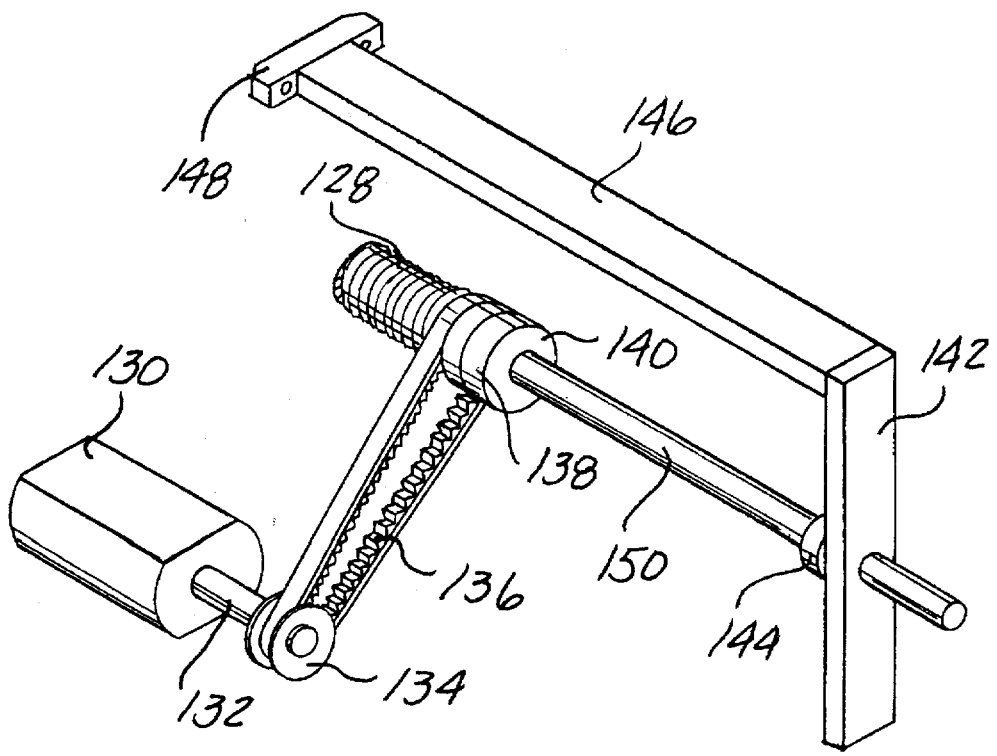
FIG. 7 is a perspective view of the adjustable positioning means for one of the notch forming dies.

Referring now to FIG. 7, there is depicted an adjustable positioning means denoted generally by reference number 126 which provides adjustable positioning of one of the first and second stage notch die pairs, such as the first stage notch dies 88 and 88'. A threaded lead screw 128 is provided for each of the first and second notch die pairs. One of the lead screws 128 is shown in FIG. 7 and is co-axially arranged with the other lead screw, not shown, for adjustable positioning of the other die stage. A drive means 130, preferably in the form of servo motor, is fixedly mounted to the lower frame or base of the press used in the notch die station 14. The servo motor has a bi-directionally rotatable output shaft 132 on which a drive gear 134 is mounted. A drive belt 136 extends from the drive gear 134 to a driven gear 138 fixedly mounted to the lead screw 128. A collar 140 is also mounted on the lead screw 128 to retain the driven gear 138 in a fixed position. In this manner, bi-directional rotation of the motor output shaft 132 is translated to bi-directional rotation of the lead screw 128.

An interconnecting structure extends from the lead screw 128 to the slide plate 68 associated with the first die stage. By way of example only, the interconnecting structure includes a first frame member 142 and a generally horizontally extending second frame member 146 which is secured to one end of the first frame member 142 by means of suitable fasteners or welds. The other end of the second frame member 146 is connected by means of a flange 148 to the slide plate 68 shown in FIG. 5.

The first frame member 142 and the collar 144 are fixedly mounted about a hollow cylindrical member 150. The cylindrical member 150 has an internally threaded bore which threadingly engages the lead screw 128. Rotation of the lead screw 128 results in reciprocal longitudinal movement of the cylindrical member 150 and a corresponding reciprocal longitudinal adjustment of the position of the slide plate 68 and the first stage dies mounted thereon.

An identical lead screw, drive motor and interconnecting structure is provided for the second dies 92 and 92'.

As described above, the roll forming machine 16 is conventional and further details as to its specific construction will not be provided herein as such are well known to those skilled in the roll forming art.

Figure 8:
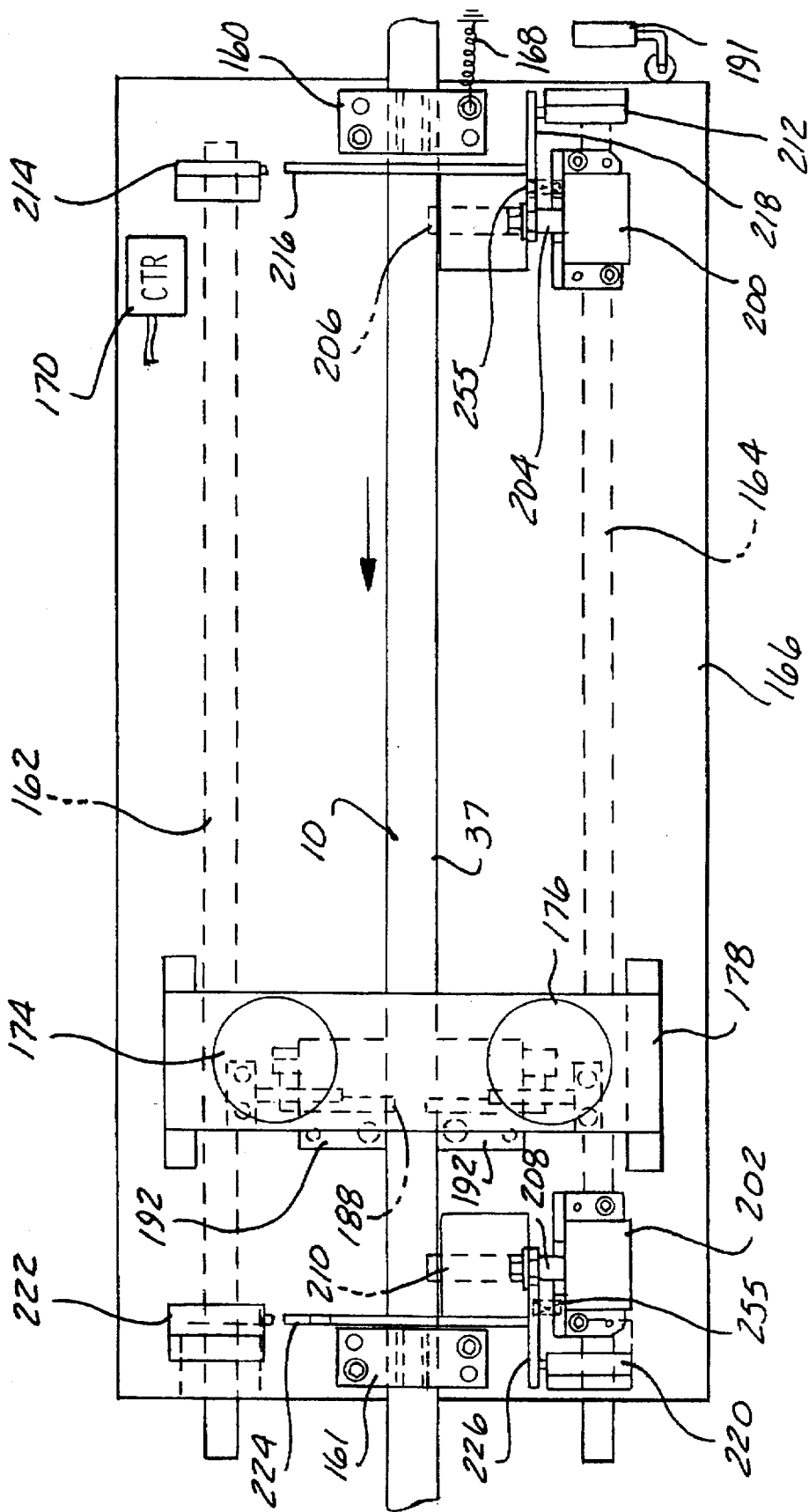
FIG. 8 is a detailed plan view of the dimension checking station shown in FIG. 4.

Upon exiting the roll forming machine 16, the strip 10 which has been formed into the exemplary configuration shown in FIGS. 1 and 3, passes through a guide 160 mounted in the dimension checking station 18 as shown in FIG. 8. The dimension checking station 18 is mounted on a support frame or base having an upper surface. A pair of longitudinally extending, generally circular cross section rails 162 and 164 are mounted on the support frame by suitably formed mounting supports. A planar slide platform 166 has depending mounting members with an internal bore sized to slidably engage the rails 162 and 164 for longitudinal sliding movement of the platform 166 from the home or first position shown in FIG. 8. At least one and preferably a pair of biasing springs 168 are connected to the slide platform 166, such as to the guide 160 at one end, and to a suitable structure on the roll forming machine 16 at another end to normally bias the slide platform 166 to the first or home position.

The metal strip 10 passes through the dimension checking station 18 from the first guide 160 to an opposed second guide 161 mounted on the downstream end of the slide platform 166.

Means are provided for moving the slide platform 166 from the home position during the notch and/or workpiece dimension checking operation. While each individual workpiece may be dimensionally checked, due to the high production rate of a typical roll forming machine, it has been found that suitable quality can be obtained by performing a dimension check once out of a predetermined number of parts, such as one for every thirty eight individual parts formed on the continuous metal strip 10.

The means for moving the platform 166, in an exemplary embodiment, includes a counter 170 mounted on the platform 166. The counter 170 is an air actuated counter which receives an air pulse at the initiation of each cycle of the notch forming press in the notch die station 14. The counter 170 is preset with a predetermined count, such as 38 in the present example, and counts down one for each pulse or cycle of the notch forming press which indicates the formation of the notches for a single workpiece in the metal strip 10. Upon reaching zero, the counter 170 generates an output signal or pulse and automatically resets to the preset count.

Figure 9:
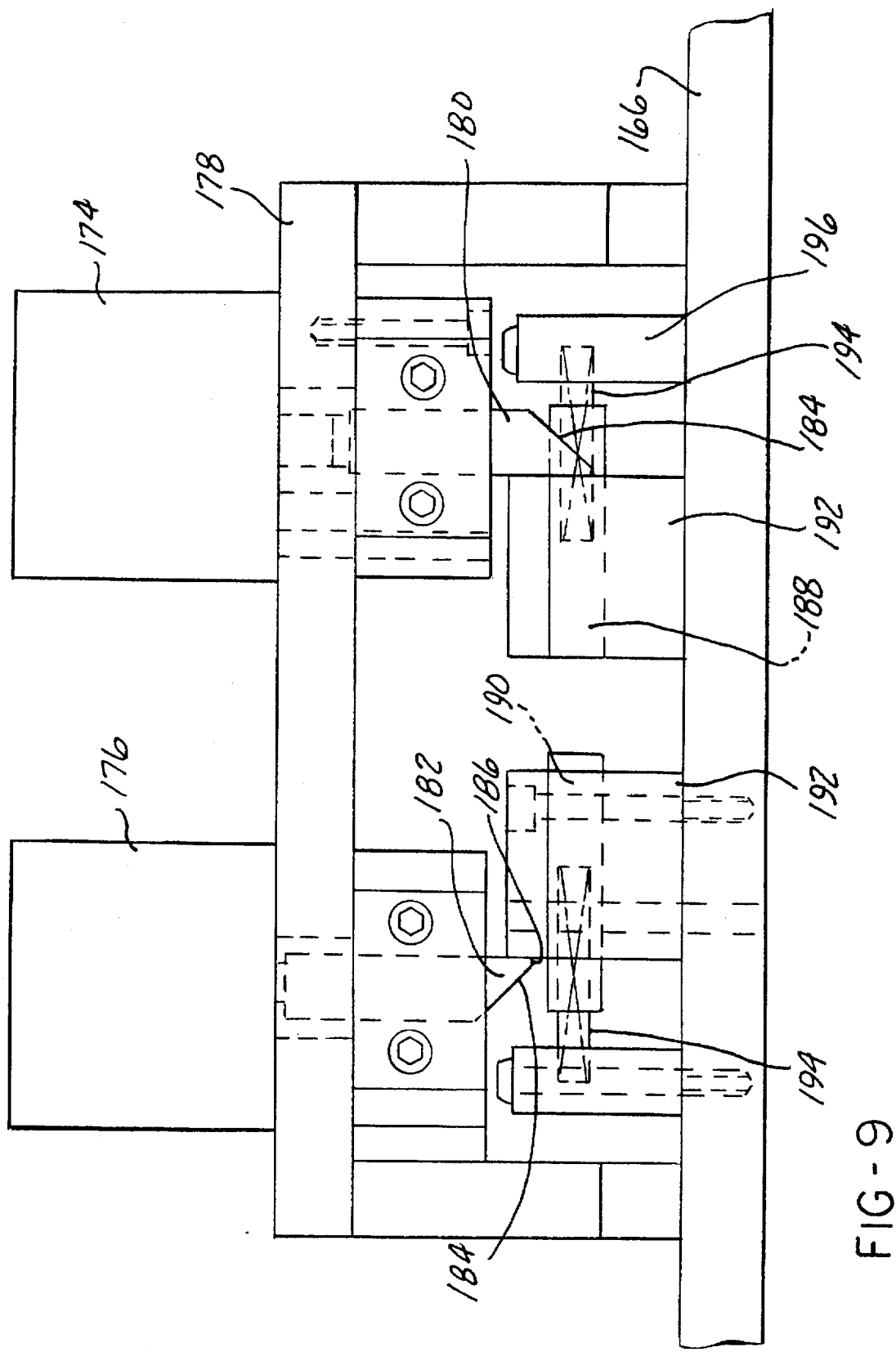
FIG. 9 is a side elevational view of the triggers mounted in the dimension checking station shown in FIG. 8.
Figure 10:
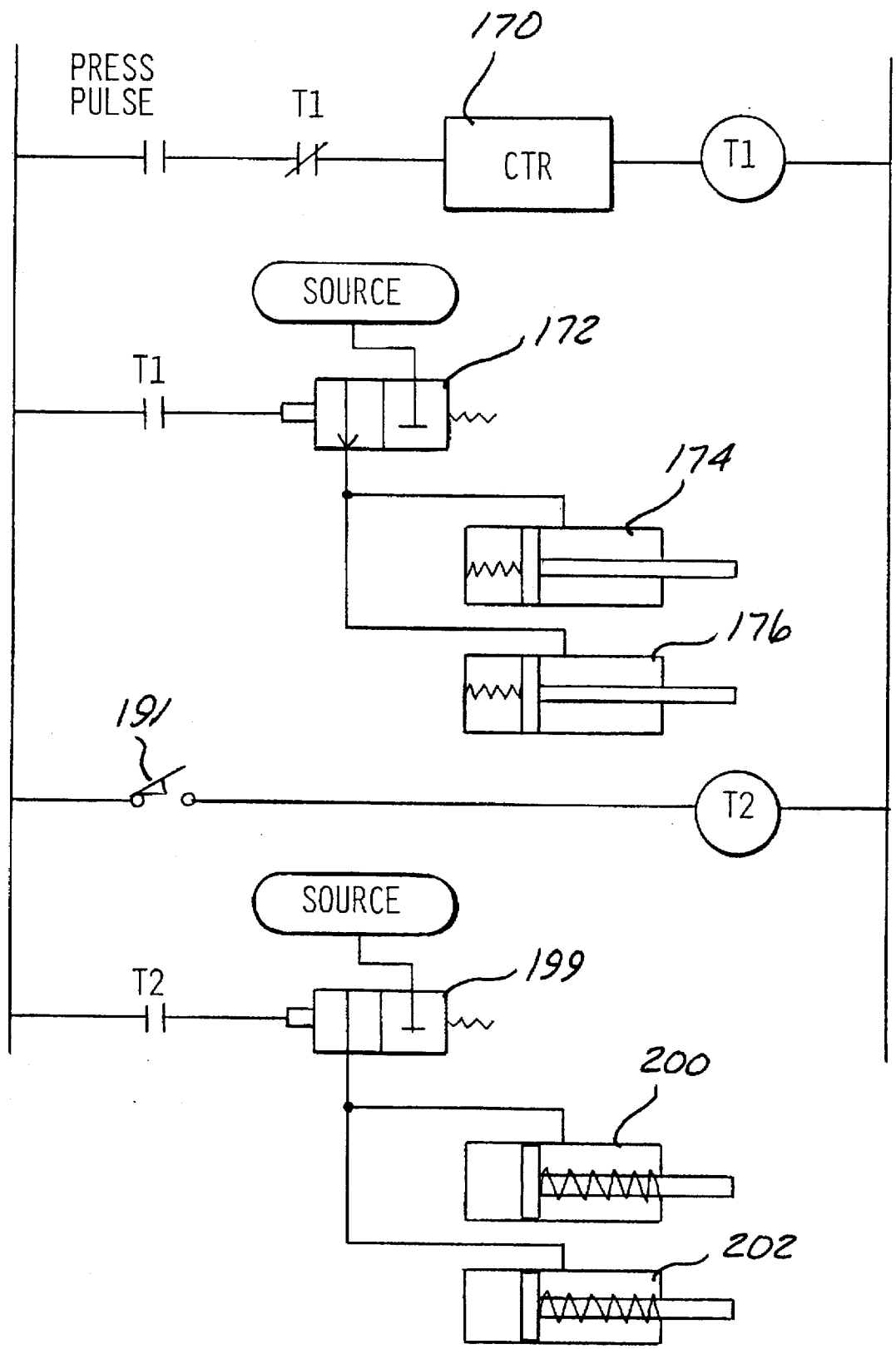
FIG. 10 is a schematic diagram of the air logic circuit employed in the dimension checking station shown in FIG. 8.

The output pulse, which in a preferred embodiment, is an air pulse from the counter 170, is supplied to the pilot of a trigger valve 172 shown in the air/pneumatic schematic diagram in FIG. 10. When activated, the trigger valve 172 supplies pressurized air from a suitable pressurized air source to a pair of cylinders 174 and 176. As shown in FIG. 9, the cylinders 174 and 176 are mounted on a frame 178 fixedly mounted on the slide platform 166. Each cylinder 174 and 176 has an extensible and retractable piston rod 180 and 182, respectively. For a better understanding of the present invention, the piston rods 180 and 182 of the respective cylinders 174 and 176 are depicted in FIGS. 8 and 9 as being in opposed extended and retracted positions. It will be understood that both cylinders 174 and 176 are actuated in unison such that the respective piston rods 180 and 182 are both extended or retracted together.

Figure 11:
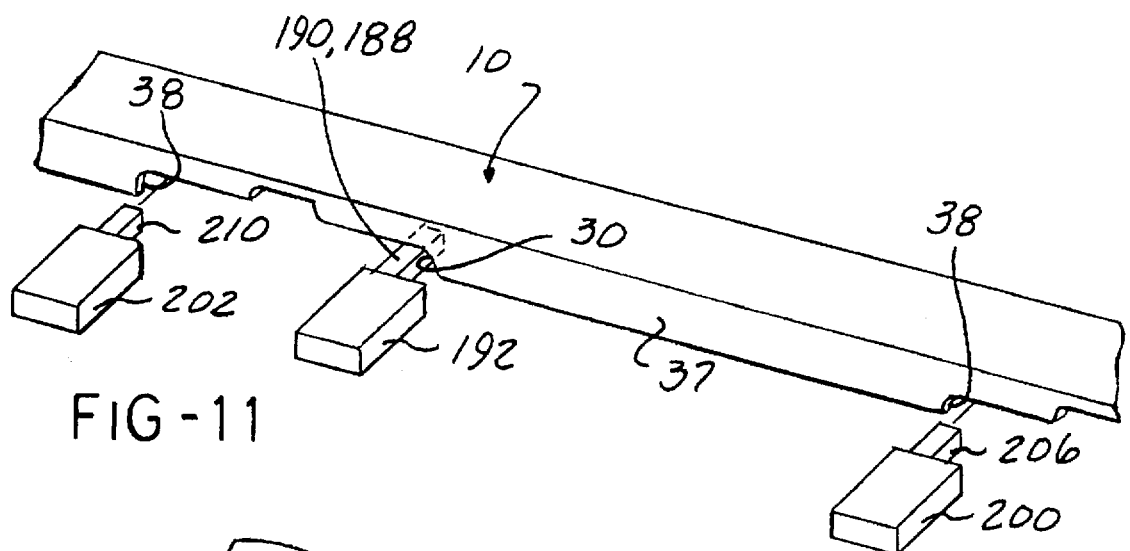
FIG. 11 is a perspective view showing the relative positions of a trigger finger and the first and second dimension sensing fingers relative to two longitudinally spaced notches on the roll formed strip.

As shown in FIG. 9, each piston rod 180 and 182 has an angled wedge shaped end 184. When the associated piston rod 182 is extended, as shown for the piston rod 180 in FIG. 9, the angled end 184 slidably engages a cam surface 186 formed in a slidably movable trigger, such as trigger 188 for the piston rod 180. A trigger 190 is operably coupled to the piston rod 182 in a similar manner. Each trigger 188 and 190 is slidably mounted in a bore in a suitably formed support block 192 mounted on the platform 166. A biasing means, such as a coil spring 194, is connected between each trigger 188 and 190 at one end and a support post 196 at another end to normally bias each trigger 188 and 190 inward from the respective support block 192 into the opening between the edges 30 and 38 as shown in FIG. 11.

In this manner, when each cylinder 174 and 176 is actuated by the trigger valve 172, pressurized air is supplied to one end of each cylinder 174 and 176 causing an immediate retraction of the respective piston rods 180 and 182. This disengages the angled ends 184 of each piston rod 180 and 182 from the respective triggers 188 and 190 allowing the biasing springs 194 to slide the triggers 188 and 190 inward from the support blocks 192 into the opening formed between the edges 30 and 38.

In this position, the end of each trigger 188 and 190 engages the folded over side flange 37 of the metal strip 10 shown in FIGS. 1 and 3. When the metal strip 10 advances sufficiently to bring a notch to a position adjacent the triggers 188 and 190, the biasing springs 194 urge the triggers 188 and 190 into the notch into engagement with the edge 30 of the notch thereby enabling continued advance of the metal strip 10 to cause sliding movement of the platform 166 from the home position shown in FIG. 8.

As shown in FIG. 10, the output pulse from the counter 170 activates an air operated timer T1 which is set with a first predetermined time period. At the expiration of the first preset time period, timer T1 deactivates the output from the counter 170 causing a subsequent deactivation of the trigger valve 172. This removes pressure to the cylinders 174 and 176 enabling the internal spring in each cylinder 174 and 176 to bias the respective piston rods 180 and 182 outward bringing the angled ends 184 of each piston rod 180 and 182 into engagement with the respective trigger 188 and 190 and sliding the triggers 188 and 190 laterally outward to disengage the triggers 188 and 190 from the metal strip 10. At this time, the biasing spring(s) 168 connected to the slide platform 166 pull the slide platform back to the home or first position shown in FIG. 8.

Upon the initial advance of the slide platform 166 from the first or home position shown in FIG. 8, the slide platform 166 will disengage from a home limit switch 191 shown in FIGS. 8 and 10. The limit switch 191, when closed, activates a second timer T2 which is preset with a second predetermined time, less than the time period of first timer T1. Timer T2 is also an air operated timer, by example, and immediately upon activation activates valve 199 shown in FIG. 10 to cause pressurized air to flow to first and second finger control cylinders 200 and 202 which are fixedly mounted at opposite ends of the platform 168 as shown in FIG. 8.

Cylinder 200 has an extensible and retractable piston rod 204 extending outward therefrom. A first finger 206 is connected to bar 218 and extends outward by springs 255 from the piston rod 204. The finger 206 has an outer end which is extensibly and retractibly movable into position adjacent the side flange 37 of the strip 10 passing through the dimension check station 18. At the expiration of the second time period for timer T2, the flow of pressurized air to one side of the piston in the cylinder 200 will cease. Another valve, not shown, is employed to shift the position of the piston and piston rod 204 causing a retraction of the first finger 206 from the position shown in FIG. 8.

A similar structure is provided for the second cylinder 202 which has an extensible and retractable piston rod 208 extending outward from one end. A second finger 210 is mounted on and extends outward from the piston rod 208 to a position shown in FIG. 8 immediately adjacent the side flange 37 of the advancing metal strip 10.

As shown in FIG. 8, and in further detail in FIG. 11, the first cylinder 200 is positioned so as to place the first finger 206 in proximity with the leading edge 38 of one notch in the advancing metal strip 10. The second cylinder 202 is positioned to place the second finger 210 in proximity with the leading edge 38 of an immediately adjacent downstream notch in the metal strip 10.

As shown in FIG. 8, first and second limit switches 212 and 214 are fixedly mounted on one end of the platform 166. Each limit switch 212 and 214 is conventional in construction and includes a movable plunger. A limit switch actuating means is connected to the finger 206 on the cylinder 200 and is movable therewith for actuating one of the limit switches 212 or 214 depending upon the length of advance of the finger 206 and the piston rod 204.

The limit switch actuating means comprises a t-bar arrangement formed of a first leg 216 which extends generally perpendicular from a second leg 218. One end of the second leg 218 has an open ended slot which is spring loaded by springs 255 about the piston rod 204 to cause sliding movement of the first and second legs 216 and 218 with extension of the piston rod 204. The limit switches 212 and 214 are positioned such that when the first finger 206 engages the side flange 37 of the metal strip immediately adjacent the leading edge 38 of one notch in the metal strip 210, as shown in FIG. 11, the second leg 218 will be in engagement with the plunger of the limit switch 212 thereby activating the limit switch 212 to provide an output signal to the control means 22. If the notch is longer in overall length, such as caused by elongation of the metal strip 10, as described above during the roll forming operation, the first finger 206 will advance further upon actuation of the cylinder 200 into the notch and past the leading edge 38 of the notch. This will cause a sliding movement of the first and second legs 216 and 218 of the limit switch actuating means thereby disengaging the second leg from the plunger of the limit switch 212 and bringing one end of the first leg 216 into engagement with the plunger of the limit switch 214 thereby activating the limit switch 214 to send a signal to the control means 22.

A second set of limit switches 220 and 222 are fixedly mounted on the platform 166 and are associated with the second finger cylinder 202. A second limit switch actuating means formed of a first leg 224 and a second leg 226 is provided for respectively activating the limit switches 220 or 222 upon extension of the second finger 210. The first and second legs 224 and 226 are substantially identically constructed to the legs 216 and 218 and respectively activate the limit switches 220 and 222 when the second finger 210 engages the side flange 37 of the strip or advances through the notch past the leading edge 38 of the notch as shown in FIG. 11. Outputs from the limit switches 220 and 222 are also input to the control means 22.

The limit switches 212, 214, 220 and 222 cooperate with the trigger 190 and 188 to check two separate dimensions on the strip 10. As shown in FIG. 11, the first finger 206 and the triggers 188 and 190 which respectively are positioned adjacent the leading edge 38 of one notch and the trailing edge 30 of a downstream notch on the strip 10 provide a dimension check for the overall length of a workpiece. The second finger 210 also cooperates with the triggers 188 and 190 to provide a dimension check for the length of each notch in a subsequently formed workpiece cut from the metal strip 10.

Generally, the limit switches 212, 214, 220 and 222 in conjunction with the triggers 188 and 190 provide the following notch and workpiece length dimension information. When limit switch 212 is made, as will occur when the first finger 206 engages the side flange 37 on the metal strip 10 immediately adjacent the leading edge 38 of one notch in the strip 10, the output signal from the limit switch 212 will indicate that the overall length of a single workpiece to be subsequently cut from the strip 10 is too long. Similarly, when limit switch 214 is made, the output of the limit switch 214 is an indication that the overall length of a single workpiece is too short.

When limit switch 220 is made, such as by the second finger 210 engaging the side flange 37 the metal strip 10 immediately adjacent the leading edge 38 of a downstream notch in the strip 10, the output of the limit switch 220 indicates that the overall notch length is too short. Similarly, when limit switch 222 is made, the output of limit switch 222 indicates that the notch length is too long.

Figure 13:
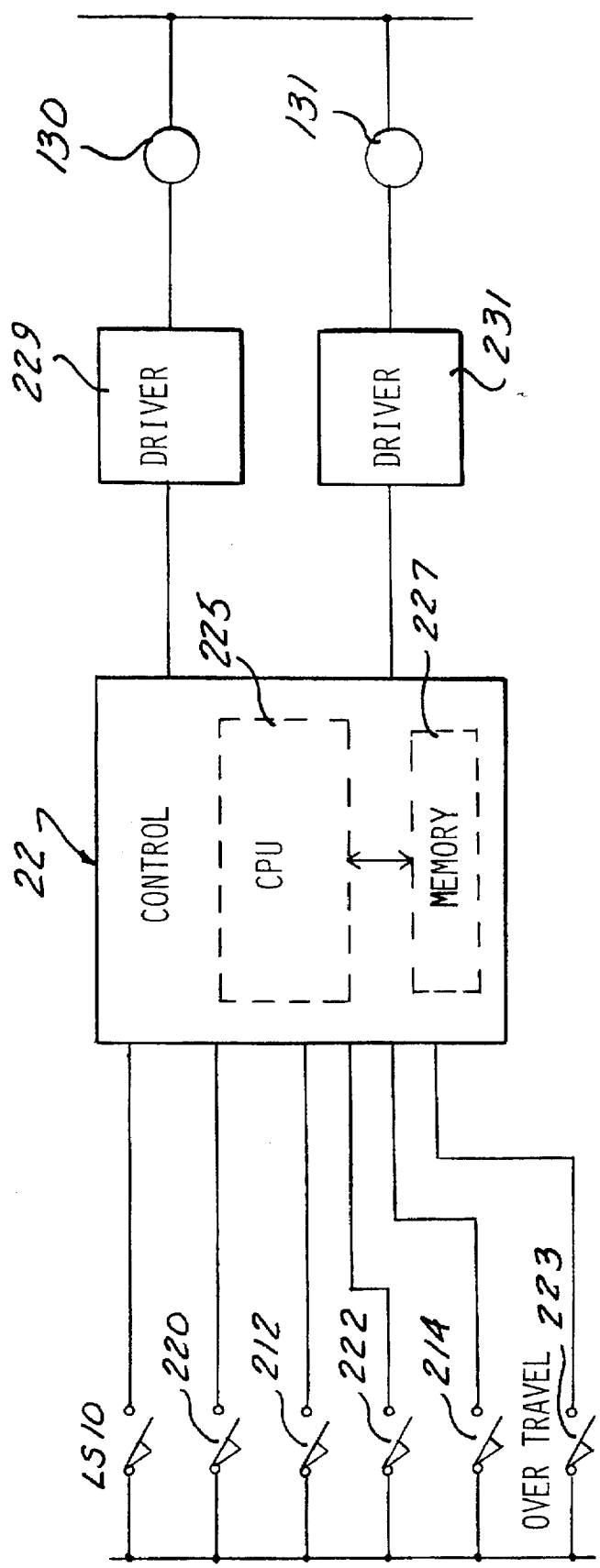
FIG. 13 is a schematic diagram of the control means, drive motors and sensors of the present apparatus.

An over travel detector 223, shown only in schematic form in FIG. 13, is also mounted on the frame supporting the platform 166 to provide an emergency over travel signal to the control means 22 to immediately stop the complete roll forming process in the event of overtravel of the platform 166.

The control means 22, shown in FIG. 4 and in greater detail in FIG. 13, preferably includes a central processing unit (CPU) 225 which executes a control program stored in memory. By way of example only, the control means is a "Motion Plus" EDC 200 Digital Servo Controller manufactured by Custom Servo Motors, Inc. This control means 22 has various inputs and outputs associated therewith and includes a keyboard input and a readout display. The control means 22 provides output signals to two conventional servo drivers 229 and 231 which convert digital output signals from the control means 22, as described hereafter, to predetermined amounts of angular rotation of the lead screws in the notch die station 14 to adjust the position of the first and second dies 88, 88', 92 and 92'.

Figure 12:
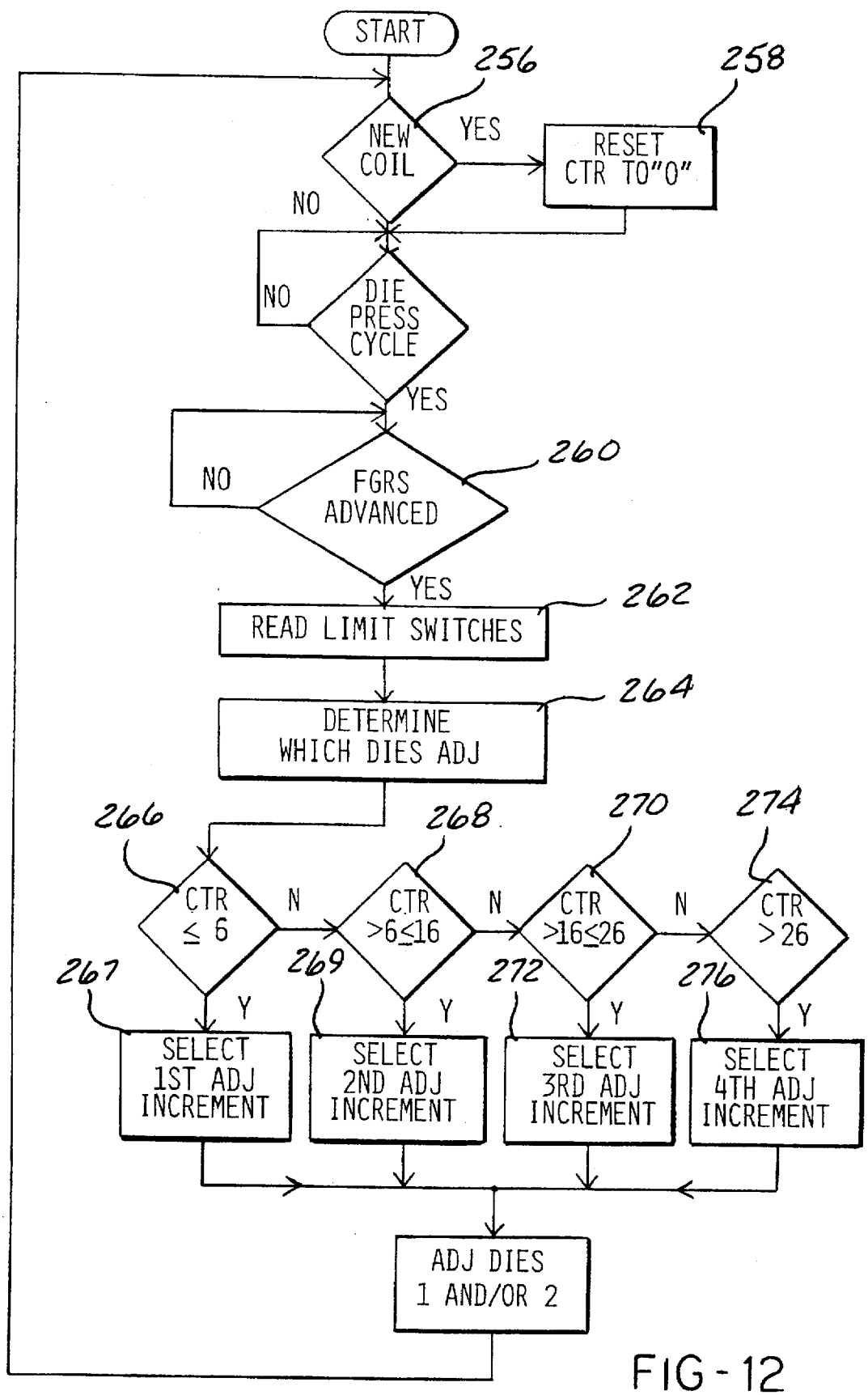
FIG. 12 is a block diagram of the control program executed by the control means.

A block diagram of a control program stored in memory 227 and executed by the CPU 225 of the control means 22 is shown in FIG. 12. Upon activation, the CPU 225 checks in step 256 for the installation of a new coil 12. When a new coil 12 is provided for the roll forming process, the CPU 225 resets an internal part counter to zero in step 258. Upon each signal from the counter 170 on the platform, the CPU 225 sends a signal to the servodrivers 229 and 231.

Next, the CPU 225 determines if all of the fingers 206 and 210 have been actuated to their dimension checking position. When an output from limit switch 221 is present in step 260, the CPU 225 reads the limit switches 212, 214, 220 and 222 in step 262 and makes a determination as to the overlength or shortness of the part length or the notch length. Depending on the part count in the internal counter, the CPU 225 then generates first and second die adjustment increments in step 264 to adjustably reposition the first and second dies 88, 88', 92 and 92'.

As an exemplary convention, a positive change in the position of either of the first and second dies 88, 88', 92 and 92' causes a movement of the first and second dies 88, 88', 92 and 92' in a downstream direction away from the coil 12. A negative dimension change in the position of either of the first and second dies 88, 88', 92 and 92' results in a movement of either of the first and second dies toward the coil 12. As such, actuation of limit switch 214 indicating that the length of an individual workpiece is too short results in a positive dimension change. Similarly, activation of limit switch 222 indicating that the notch length is too long results in a negative die position change. Correspondingly, actuation of limit switches 212 and/or 220 indicating that the notch length is too short or the overall workpiece length is too long create negative die position changes, respectively.

Further, the CPU 225 utilizes the signals from limit switches 212 and 214 to control the position of only the second dies 92 and 92'. The CPU 225 uses the outputs of all of the limit switches 212,214, 220 and 222 to adjustably position the first dies 88 and 88'. Thus, for the first dies 88 and 88', the CPU 225 will provide the preprogrammed positive or negative incremental change in the position of the first dies 88 and 88' to lengthen or shorten each notch formed in the metal strip 10 thereby changing the notch length and/or the overall length of an individual workpiece. The outputs of limit switches 212 and 214 result in a repositioning of only the second dies 92 and 92' to thereby vary the overall length of an individual part.

Depending upon which of the limit switches 212, 214, 220 and 222 are actuated, various combinations of positive and negative incremental moves of the first dies 88 and 88' are possible. Activation of both of the limit switches 212 and 222, which respectively indicate a negative and a positive positional incremental change, cancel each other out thereby causing no change in the position of the first dies 88 and 88'. Similarly, simultaneous activation of both limit switches 220 and 214 also cause a cancellation such that no change is made in the position of the first dies 88 and 88'. Double positive or negative advances in the position of the first dies 88 and 88' are also possible upon the simultaneous actuation of limit switches 212 and 220 and/or limit switches 214 and 222.

Referring again to FIG. 12, after reading each of the limit switches 212, 214, 220 and 222 in step 262, the CPU 225 checks an internal part counter in step 266 for a total part count of less than or equal to six. If the total part count is less than or equal to six, the CPU 225 outputs signals to the two servo drivers in step 267 causing a first incremental change in the position of the first and/or second dies 88, 88', 92 and 92'. If the part count is greater than six and less than or equal to sixteen as detected in step 268, the CPU 225 output signals to the servo drivers in step 269 causing a second, different incremental adjustment in the position of the first and/or second dies 88, 88', 92 and 92'. Similarly, if the total part count is greater than sixteen or less than twenty six in step 270, the CPU 225 generates a third incremental adjustment signal in step 272 to vary the position of the first and/or second dies 88, 88', 92 and 92' in step 272. Finally, if the total part count is greater than twenty six, in step 274, the CPU in step 276 outputs a fourth incremental change signal.

According to an exemplary dimensional change, when the total part count is less than or equal to six, the CPU 225 will output appropriate digital values to either or both of the servo drivers 229 and 231 associated with the first and second dies 88, 88', 92 and 92' to cause a positive or negative 0.015 inch change in the position of the first and/or second dies 88, 88', 92 and 92'. When the part count as indicated in step 268 is greater than six and less than or equal to sixteen, the CPU 225 outputs digital values to the servo drivers 229 and 231 causing a positive or negative incremental change of 0.0025 inches in the position of the first and/or second dies 88, 88', 92 and 92'. Similarly, when the part count is greater than sixteen and less than or equal to twenty six as indicated in step 270, the CPU 225 outputs digital values to the servo drivers 229 and 231 causing a third incremental positive or negative change of 0.001 inches in the position of the first and/or second dies 88, 88', 92 and 92'. Finally, when the part count is greater than twenty six as indicated in step 274, the CPU 225 generates digital values causing an incremental positive or negative change in the position of the first and/or second dies 88, 88', 92 and 92' in the amount of 0.0005 inches.

Figure 14:
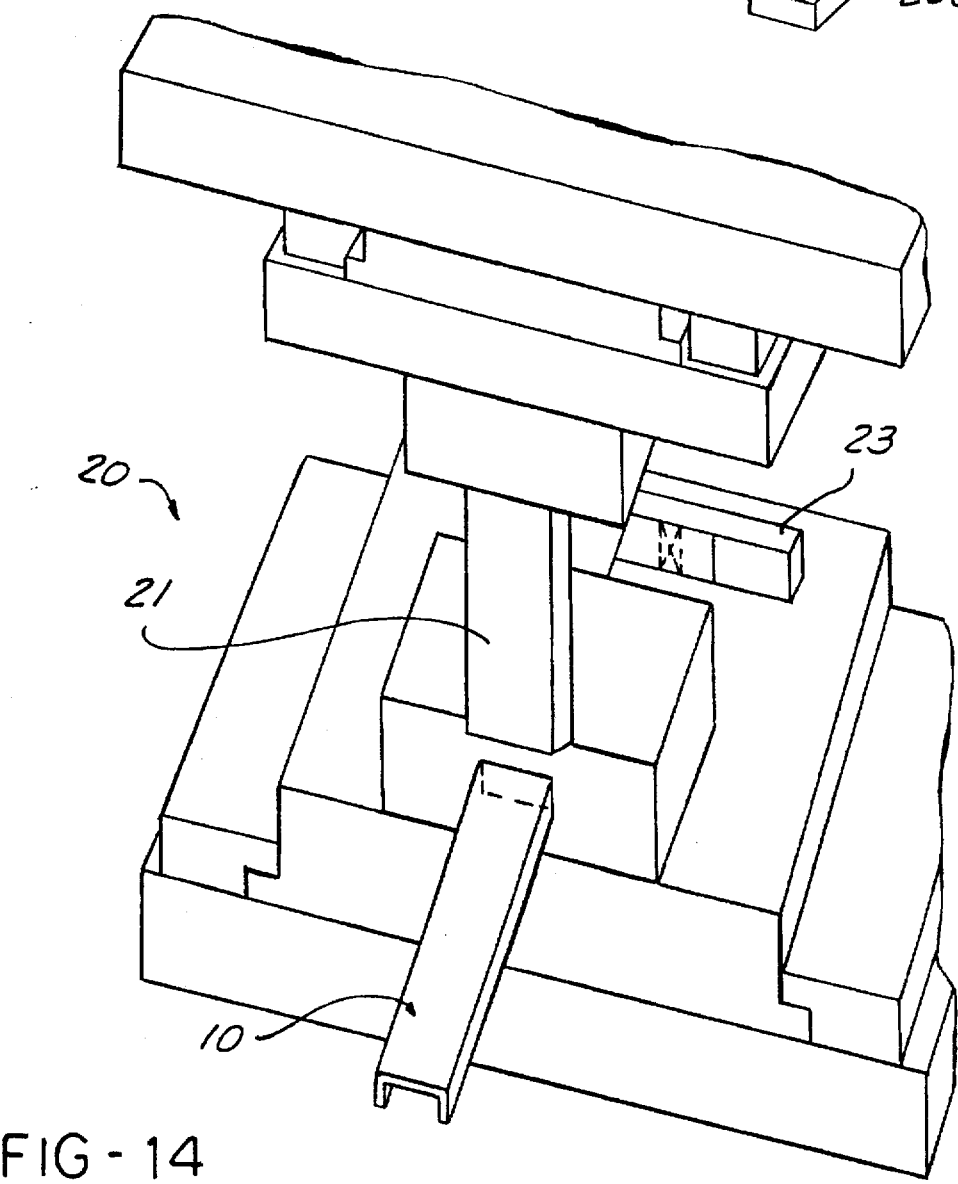
FIG. 14 is a partial perspective view of the cutoff press.

Finally, as shown in FIGS. 4 and 14, the workpiece length cut station 20 is of conventional construction and includes a press containing a conventional cutter element or cutoff blade 21. The cutoff blade 21 is mounted in a retainer carried on an upper die shoe slidably mounted in a slide which is released for sliding movement when a trigger 23 mounted in the cutoff station 20 is activated by engagement with a trailing edge 30 of each notch in the metal strip 10. The slide moves forward with the advancing strip 10 to enable the cutoff blade 21 to cut an individual workpiece shown in FIG. 3, from the end of the metal strip 10.

As soon as the limit switch is activated upon engagement with the trailing edge 30 of each notch, the limit switch output activates the press to extend the cutoff blade 21. The cutoff blade 21 automatically retracts upon completion of each press cycle. At the completion of each press cycle, a signal from the press control causes the trigger 23 to retract thereby enabling the slide to retract to a home position via a biasing spring, not shown.

In summary, there has been disclosed a unique apparatus and method for prenotching and dimensionally checking a roll formed part in which the overall length of part as well as the length of the notches in a part are dimensionally checked and adjustments made to the position of the notch forming dies to compensate for elongation in the metal strip undergoing roll forming. The dimension checking and notch die adjustment take place concurrent with the roll forming operation so as not to adversely affect roll forming production speed.

What is claimed is:

1. A method for forming a roll formed part from a metal strip having opposed longitudinally extending side edges, the method comprising the steps of:

successively forming a plurality of longitudinally spaced first notches each having longitudinally opposed first and second edges in one side edge of a metal strip by notch forming means;

roll forming the strip to a formed configuration by passing the strip progressively through a plurality of roller sets;

sensing a notch dimension in the strip after roll forming;

comparing the sensed notch dimension with a nominal notch dimension; and if a difference is detected between the sensed notch dimension and the nominal notch dimension, adjusting the longitudinal position of the notch forming means to reduce the difference toward zero.

2. The method of claim 1 further comprising the steps of:

forming each of the first notches in two stages by forming a first portion of each first notch by a first die in a first stage and forming a second portion of each first notch by a second die in a second stage.

3. The method of claim 1 wherein the step of comparing further comprises the step of:

detecting a dimensional difference between a dimension between the first and second longitudinally spaced edges of one of the first notches and a nominal dimension between the first and second edges of the first notch.

4. The method of claim 1 wherein the comparing step further comprises:

detecting a dimension difference between one of the first and second edges of one first notch and a like one of the first and second edges of the subsequent first notch in the strip and a like nominal dimension.

5. The method of claim 1 wherein the step of sensing a notch dimension comprises the steps:

advancing a first locator toward the first edge of one first notch;

advancing a second locator toward a second edge of the one first notch; and sensing a dimension between the first and second edges of the one first notch by the position of the first and second locators.

6. The method of claim 5 further comprising the step of:
generating a first difference signal upon a non-full advance of the second locator into the one first notch.

7. The method of claim 6 further comprising the step of:
generating a second difference signal upon a full advance of the second locator into the one first notch.

8. The method of claim 1 wherein the step of sensing a notch dimension further comprises the steps of:
advancing a first locator toward the first edge of one first notch;
advancing a third locator toward the second edge of a consecutively spaced first notch; and
sensing the distance of advance of the third locator.

9. The method of claim 8 wherein the step of sensing a notch dimension further comprises the step of:
generating a first difference signal upon detecting a non-full advance of the third locator into the one first notch.

10. The method of claim 9 further comprising the step of:
generating a second difference signal upon detecting a full advance of the third locator into the one first notch.

11. The method of claim 1 further comprising the steps of:
forming a pair of notches on the opposite side edges of the metal strip.

12. The method of claim 2 further comprising the steps of:
adjustably positionably mounting the first die in the first stage;
adjustably positionably mounting the second die in the second stage; and
adjustably positioning the first and second dies independent of each other in response to a difference detected between a sensed notch dimension and a nominal dimension.

13. The method of claim 12 wherein the step of adjusting position of the first and second dies comprises the step of:
adjustably positioning at least one of the first and second dies in response to a detected dimensional difference.

14. The method of claim 12 comprising the steps of:
adjusting the longitudinal position of at least one of the first and second dies to vary one of the length of the one first notch between the first and second edges of the one first notch and the length between a like one of the first and second edges of two successive, spaced first notches.

15. An apparatus for forming a roll form part from a metal strip having opposed first and second side edges, the apparatus comprising:
notch forming means for successively forming a plurality of longitudinally spaced first notches in one of the first and second side edges of a longitudinally advancing metal strip, each first notch having longitudinally spaced first and second edges;

means for adjustably positioning the notch forming means;

roll forming means for forming the metal strip into a formed configuration;

means for sensing a first notch dimension in the formed configuration of the metal strip, the sensing means generating an output signal indicative of the sensed first notch dimension; and control means, responsive to the output signal, for comparing the output signal with a nominal first notch dimension and for generating an adjustment signal to the means for adjustably positioning the notch forming means upon determining a difference between the sensed first notch dimension and the nominal first notch dimension.

16. The apparatus of claim 15 wherein:
the notch forming means further includes means for forming first notches in each of the first and second side edges of the strip, the first notches laterally spaced from each other on the strip.

17. The apparatus of claim 15 wherein the notch forming means comprises:
first die means for forming a first portion of each first notch; and
second die means for forming a contiguous second portion of each first notch.

18. The apparatus of claim 17 wherein:
the adjustable positioning means adjustably positions at least one of the first and second die means.

19. The apparatus of claim 17 wherein:
the adjustable positioning means adjustably positions both of the first and second die means.

20. The apparatus of claim 15 wherein the means for sensing a notch dimension comprises:
first and second locators movably engagable with opposed first and second edges of one first notch in the strip; and
sensor means for detecting first and second positions of at least one of the first and second locator, the first position indicative of one of the first and second locators engaging the metal strip but not disposed within the first notch, the second position indicative of one of the first and second locators passing into the first notch.

21. The apparatus of claim 15 wherein the means for sensing a notch dimension comprises:
first and third locators movably engagable with like positioned first and second edges of two longitudinally spaced first notches in the strip; and
sensor means for detecting first and second positions of each of the first and third locators, respectively.

* * * * *